D. L. Branning,
Odometer.

No. 112,116. Patented Feb. 28, 1871.

Witnesses:
G. Raettig
L. S. Mabee

Inventor:
D. L. Branning
pr
Attorneys.

UNITED STATES PATENT OFFICE.

DAVID L. BRANNING, OF TAMPA, FLORIDA.

IMPROVEMENT IN ODOMETERS.

Specification forming part of Letters Patent No. 112,116, dated February 28, 1871.

*To all whom it may concern:*

Be it known that I, DAVID L. BRANNING, of Tampa, in the county of Hillsborough and State of Florida, have invented a new and Improved Odometer; and I do hereby declare that the following is a full, clear, and exact description thereof, which will enable others skilled in the art to make and use the same, reference being had to the accompanying drawing, forming part of this specification.

This invention relates to improvements in odometers; and consists in an arrangement of adjustable arms on the axle, to which motion is imparted by the wheel of the vehicle, which arms may be set for indicating the distance traveled by wheels of different diameters.

It also consists in a combination, with the said arms, of a secondary set, pivoted to the frame, and arranged for indicating the fractions of miles, as hereinafter described.

Figure 1:
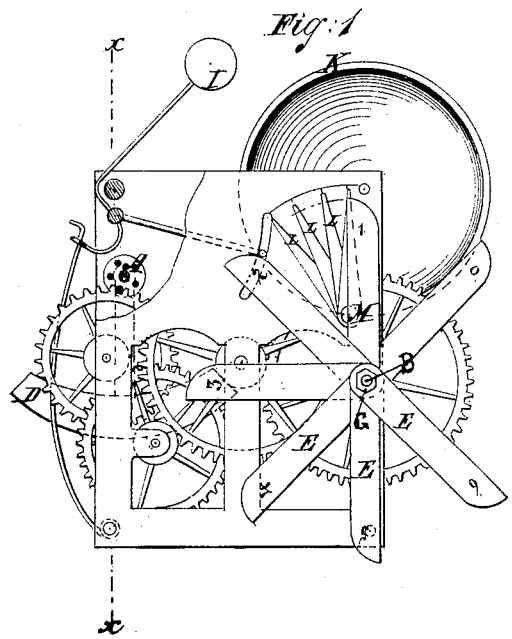
Figure 2:
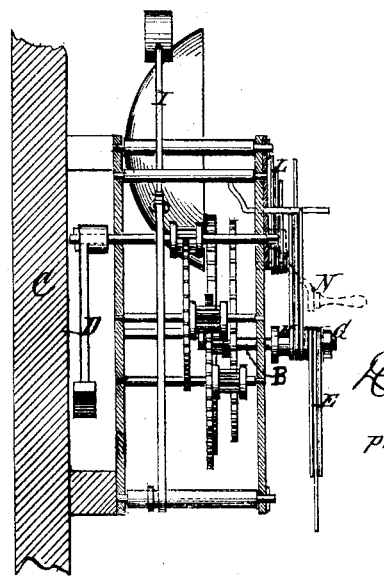

Figure 1 is a front elevation of my machine, partly sectioned; and Fig. 2 is a sectional elevation taken on the line $x$ $x$ of Fig. 1.

Similar letters of reference indicate corresponding parts.

In this instance I have represented a train of clock-gear for reducing the motion, of which A is the first-motion shaft, and B the last; but I propose to avail myself of any suitable or preferred arrangement of gearings for the purpose, which I attach in any suitable way to a plate, C, or other suitable means for attachment to the spokes of a wheel next to the hub, by straps or other suitable means, so that the apparatus will be carried around the axis of the wheel to impart motion to the first-motion shaft by a pendulum, D, whose gravity will be sufficient to cause the train to turn as the shaft to which it is connected is turned around the axis of the wheel of the vehicle.

To the axis B, I apply a number of arms, E, so that they may be adjusted for making the angles between them greater or lesser, and secured at any position, which may be done by fitting them loosely on the shaft, and providing a nut, G, for screwing them up tightly against a collar, H. These arms are numbered consecutively from zero up. In this example I have represented six; but I prefer to have twenty. They are arranged to raise a bell-hammer, I, once in each revolution, so that when escaping from it a bell, K, will be sounded.

L represents pointers attached to a stud, so that they may be adjusted for varying the angle between them. They are for indicating the fractions of a mile traveled, being arranged on the frame of the machine so as to divide the distance between two of the arms E into four parts, and arranged so that the said arms, moving over them immediately after tripping the bell-hammer, show, by their local relation to the pointers L, when a quarter or other fraction of a mile has been traveled.

The size of the wheel to which the instrument is to be attached being taken, and the number of revolutions it will make in a mile being found, the arm marked O is adjusted on the shaft B to the starting-point—that is, where the bell-hammer arm escapes from it to strike the blow. The first-motion shaft, together with the pendulum, are then turned around by hand (for which a crank, N, is to be provided) as many times as the aforesaid wheel turns in running a mile. This will cause the arm O to move around the axis B as much as it would if it had run with the said wheel a mile, which distance is ascertained by dividers or other means, and thus all the arms are set as far apart as the said ascertained distance that the arm O has moved, the latter being first moved back to the starting-point. The instrument is then ready for operation, and is attached to the wheel, which, being set in motion, will cause the bell to sound at the end of each mile for as many miles as there are arms, after which it must be set, with the arm O at the starting-point again.

If it be desired to know the fractions of miles, the small arms L are adjusted at starting to the proper distances from the starting-point to indicate the required fractions of the said distance traveled by the arm O when the shaft A is turned, as above stated.

It is intended to arrange the apparatus in any suitable box or case, and provided with glass over that part where the arms escape from the bell-hammer arm, so that the arms may be seen, which, being numbered, as before stated, show the distance traveled.

Having thus described my invention, I claim as new and desire to secure by Letters Patent—

1. The combination, with the reducing-train, or the axle of the final wheel thereof, of an odometer, of the adjustable arms E, substantially as specified.

2. The combination, with the reducing-train, or the axle of the final wheel thereof, and the bell-hammer, of the adjustable arm E, substantially as specified.

3. The combination, with the adjustable arm E, of the adjustable pointers L, substantially as specified.

The above specification of my invention signed by me this 29th day of July, 1870.

DAVID L. BRANNING.

Witnesses:
   GEO. W. MABEE,
   T. B. MOSHER.